US010760295B2

(12) United States Patent
    Attema

(10) Patent No.: US 10,760,295 B2
(45) Date of Patent: Sep. 1, 2020

(54) ARTICULATING DWELLING FRAME AS ADD-ON TO EXISTING VEHICLES

(71) Applicant: Daniel Andrew Attema, Soquel, CA (US)

(72) Inventor: Daniel Andrew Attema, Soquel, CA (US)

(*) Notice: Subject to any disclaimer, the term of this patent is extended or adjusted under 35 U.S.C. 154(b) by 0 days.

(21) Appl. No.: 16/437,913

(22) Filed: Jun. 11, 2019

(65) Prior Publication Data
    US 2019/0292806 A1    Sep. 26, 2019

Related U.S. Application Data

(63) Continuation-in-part of application No. 15/783,486, filed on Oct. 13, 2017, now Pat. No. 10,316,541.

(51) Int. Cl.
    *E04H 15/06*      (2006.01)
    *B60P 3/38*       (2006.01)
    *E04H 15/48*      (2006.01)
    *B60P 3/34*       (2006.01)

(52) U.S. Cl.
    CPC .............. *E04H 15/06* (2013.01); *B60P 3/34* (2013.01); *B60P 3/38* (2013.01); *E04H 15/48* (2013.01)

(58) Field of Classification Search
    CPC ........... B60P 3/38; E04H 15/06; E04H 15/008
    See application file for complete search history.

(56) References Cited

U.S. PATENT DOCUMENTS

| 2,291,900 | A | * | 8/1942 | Jimmes | ................ | B60P 3/38 |
| | | | | | | 135/88.13 |
| 3,021,852 | A | * | 2/1962 | Hoffman | ................ | B60P 3/38 |
| | | | | | | 135/88.18 |
| 3,506,299 | A | * | 4/1970 | Arnold | ................. | B60P 3/341 |
| | | | | | | 296/170 |
| 4,055,366 | A | * | 10/1977 | Lee | ................. | B60P 3/38 |
| | | | | | | 296/160 |
| 4,251,102 | A | * | 2/1981 | Lee | ................. | B60P 3/38 |
| | | | | | | 135/88.16 |
| 4,548,438 | A | * | 10/1985 | Myers | ................. | B60P 3/38 |
| | | | | | | 135/88.16 |
| 9,222,278 | B2 | * | 12/2015 | Park | ................. | E04H 15/06 |

* cited by examiner

*Primary Examiner* — Noah Chandler Hawk
(74) *Attorney, Agent, or Firm* — Donald R. Boys; Central Coast Patent Agency LLC

(57) ABSTRACT

An add-on articulated dwelling apparatus vehicles has a stationary frame having opposite parallel channels, an extension platform having slidably engaged in the stationary frame, a mattress carried by the extension platform, a cover panel hinged to the extension frame, and fabric panels joined to the cover panel and to the stationary platform, and to links pivotally joined to the stationary platform, and mounting apparatus for joining the articulated dwelling apparatus to the one of the vehicles.

5 Claims, 20 Drawing Sheets

ARTICULATING DWELLING FRAME AS ADD-ON TO EXISTING VEHICLES

CROSS-REFERENCE TO RELATED DOCUMENTS

The present invention is a continuation-in-part (CIP) of co-pending application Ser. No. 15/783,486, filed Oct. 13, 2007. All disclosure of the parent application is incorporated herein at least by reference.

BACKGROUND OF THE INVENTION

1. Field of the Invention

The present invention is in the field of mechanical frame structures and pertains particularly to methods and apparatus for creating a deployable and retractable personal environmental enclosure.

2. Discussion of the State of the Art

Mechanized mechanical framing generally includes any frame structure where at least a part of the frame structure is mechanized to form a feature of the structure, such as a platform, a wall, an extension span, or some other physical and useful trait or feature of the apparatus. Mechanical framing is used in home construction, recreational vehicle (RV) construction (Pop-Outs), and other types of construction framing. Personal enclosures like tents are available that use mechanical framing at least to some degree such as, for example, a pop-up tent trailer.

One problem with current art mechanical framing structure relative to a personal enclosure such as a tent, is that assembly of some amount is typically required to effect and erect the frame structure, and to apply appropriate covering, such as tent material to the structure defining the enclosure. Another problem is that such structures in the art are not well-adapted to being integrated with existing vehicles.

Therefore, what is clearly needed is a deployable and retractable personal enclosure that eliminates a requirement for previous or instant assembly of framing components and application of covering fabric for the enclosure, and that is easily integrated with existing vehicles, particularly vehicles that have removable roofs or upper portions.

BRIEF SUMMARY OF THE INVENTION

In an embodiment of the invention an add-on articulated dwelling apparatus for a vehicle having a removable top and a cab with a windshield is provided, comprising a stationary frame having opposite parallel channels for translating an extension platform, a forward edge and a trailing edge, an extension platform having parallel linear members slidably engaged in the channels of the stationary frame, the extension platform having an extended edge and a trailing edge, a mattress carried by the extension platform, a cover panel hinged to the extended edge of the extension frame, and joined by pivoting links to the opposite parallel channels of the stationary frame, fabric panels joined to an edge of the cover panel opposite the hinged edge, and to the trailing edge of the stationary platform, and to links pivotally joined to the stationary platform, and two side panels joined beneath the opposite parallel channels of the stationary frame, the side panels adapted to join along bottom edges to mounting shelves provided on the vehicle. The add-on articulated dwelling is assembled to the vehicle by removing the top of the vehicle, joining the side panels to the mounting shelves, placing the parallel channels of the stationary frame along opposite sides of the vehicle, and joining the forward edge of the stationary frame to the vehicle across the top of the windshield.

In one embodiment mattress is carried by a frame that is hinged to the front of the extension platform and comprising link elements adapted to pivot the mattress frame around the hinge to lift the mattress to be coplanar with the cover with the extension frame fully extended. In one embodiment the mattress frame comprises latch elements adapted to latch the mattress frame parallel with the extension frame, of to latch the mattress frame to the raised cover. In one embodiment the apparatus further comprises an electrically powered translation system controllable to extend and retract the extension frame. And in one embodiment the translation system comprises a threaded shaft rotatably mounted to the extension frame and driven by an electric motor, and a translation nut engaging the threaded shaft, such that running the motor in one direction extends the extension frame, and in an opposite direction retracts the extension frame.

In another aspect of the invention an add-on articulated dwelling apparatus for a pickup truck with a truck bed and a cab with a windshield is provided, comprising a stationary frame having opposite parallel channels for translating an extension platform, a forward edge and a trailing edge, an extension platform having parallel linear members slidably engaged in the channels of the stationary frame, the extension platform having an extended edge and a trailing edge, a mattress carried by the extension platform, a cover panel hinged to the extended edge of the extension frame, and joined by pivoting links to the opposite parallel channels of the stationary frame, fabric panels joined to an edge of the cover panel opposite the hinged edge, and to the trailing edge of the stationary platform, and to links pivotally joined to the stationary platform, and a back panel hinged to a rear edge of the stationary frame, with a door in the back panel. The add-on articulated dwelling is assembled to the pickup truck by joining the forward edge of the stationary frame along the top edge of the cab along the windshield, folding the back panel to vertical, and joining a bottom edge of the back panel to a rear edge of the truck bed.

In one embodiment the mattress is carried by a frame that is hinged to the front of the extension platform and comprising link elements adapted to pivot the mattress frame around the hinge to lift the mattress to be coplanar with the cover with the extension frame fully extended. In one embodiment the mattress frame comprises latch elements adapted to latch the mattress frame parallel with the extension frame, of to latch the mattress frame to the raised cover. In one embodiment the apparatus further comprises an electrically powered translation system controllable to extend and retract the extension frame. And in one embodiment the translation system comprises a threaded shaft rotatably mounted to the extension frame and driven by an electric motor, and a translation nut engaging the threaded shaft, such that running the motor in one direction extends the extension frame, and in an opposite direction retracts the extension frame.

In yet another aspect of the invention an add-on articulated dwelling apparatus for a van with an opening provided in a roof of the van and a cab with a windshield is provided, comprising a stationary frame having opposite parallel channels for translating an extension platform, a forward edge and a trailing edge, an extension platform having parallel linear members slidably engaged in the channels of the stationary frame, the extension platform having an extended edge and a trailing edge, a mattress carried by the extension platform, a cover panel hinged to the extended edge of the extension frame, and joined by pivoting links to the opposite parallel channels of the stationary frame, and fabric panels joined to an edge of the cover panel opposite the hinged edge, and to the trailing edge of the stationary platform, and to links pivotally joined to the stationary platform. The add-on articulated dwelling is assembled to the van by joining the forward edge of the stationary frame along a top edge of the cab along the windshield and joining the opposite channels of the stationary frame along lengthwise edges of the opening in the roof of the van.

In one embodiment the mattress is carried by a frame that is hinged to the front of the extension platform and comprising link elements adapted to pivot the mattress frame around the hinge to lift the mattress to be coplanar with the cover with the extension frame fully extended. In one embodiment the mattress frame comprises latch elements adapted to latch the mattress frame parallel with the extension frame, of to latch the mattress frame to the raised cover. In one embodiment the apparatus further comprises an electrically powered translation system controllable to extend and retract the extension frame. And in one embodiment the translation system comprises a threaded shaft rotatably mounted to the extension frame and driven by an electric motor, and a translation nut engaging the threaded shaft, such that running the motor in one direction extends the extension frame, and in an opposite direction retracts the extension frame.

DETAILED DESCRIPTION OF THE INVENTION

In various embodiments described in enabling detail herein, the inventor provides a unique system for deploying and retracting a personal environmental enclosure. The present invention is described using the following examples, which may describe more than one relevant embodiment falling within the scope of the invention.

The inventor provides a unique extendable and retractable mechanized frame structure for framing a personal environmental enclosure. The present invention is described in enabling detail using the following examples, which may describe more than one relevant embodiment falling within the scope of the present invention.

Figure 1:
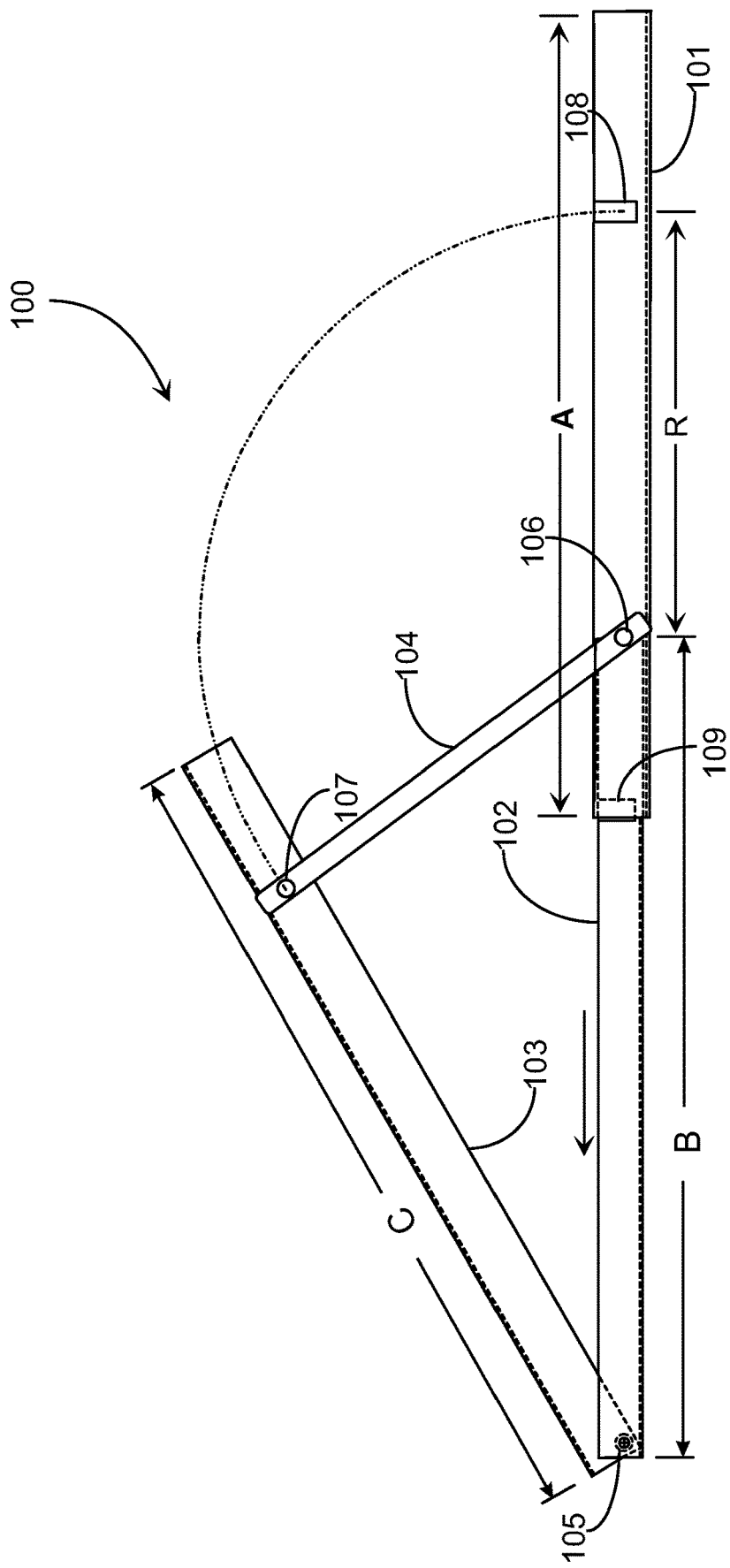
FIG. 1 is a side elevation view of a mechanized frame structure partially erected according to an embodiment of the present invention.

FIG. 1 is a side elevation view of a mechanized frame structure 100 partially extended according to an embodiment of the present invention. Frame structure 100 is adapted to be a portable and field-deployable framing structure that may be manipulated by hand or by powered mechanism to retract to a minimum volume, and to extend to raise a portion to a particular height.

Frame structure 100 includes two linear frame members 101 and 102, the linear frame members adapted to control the rest of the frame structure via linear translation relative to one another. In this particular implementation, linear member 101 is a rectangular piece having an overall length A, such as a section of rectangular channel having a bottom wall and vertical opposing walls, an open top and open at both ends. Linear member 101 may be fabricated from steel or aluminum extruded tubing, or it may be fabricated by forming a flat piece of sheet metal to form the sides. In other implementations, other durable materials might be substituted for steel or sheet metal such as a polymer molded form or rail.

Linear member 102 has an overall length, in this example B, which may, in some embodiments be the same length as A. But may vary considerably in other embodiments. Linear member 102 may be fabricated of rectangular tubing and may have the same general configuration described above relative to linear member 101, but need not be a channel. Member 102 may, in this embodiment, be a rectangular beam. The width of linear member 102 is just smaller than the inside width dimension of linear member 101, so that member 102 may fit within member 101, and may be urged to translate relative to linear member 101 by a user or by a mechanism operated by the user. In specific embodiments of the invention there may be ball bearings or journal bearing between members 101 and 102 to provide for easy translation and constraint.

With linear member 101 fixed in position, linear member 102 is, in various embodiments, a moveable component that is urged to translate within, or relative to, member 101. In various implementations, retainers, tracks, and or other machined or installed features may be provided along the inside of linear member 101 and along the outside of linear member 102 to enable linear member 102 to maintain a linear position within linear member 101, and to prevent member 102 from inadvertently coming out of the top or to prevent angular deviation from the plane of operation. Such features may include grooves, shelves, and retainer forms, stops, or blocks including a combination thereof.

In some embodiments, members 101 and 102 are not joined with one inside the other, but may be side-by-side, or one over the other. In some embodiments, member 102 is fixed and member 101 is movable. The important feature is that the two members are proximate and move relative to one another as described.

Mechanized frame 100 in this embodiment includes a third linear member 103 having an overall length, which, in some embodiments may be equal to A or B, and which may be similar in form and material, more particularly rectangular tubing. Linear member 103 may have an overall width that is just smaller than the inside width of linear member 102 and may fit into the open space of linear member 102 and may be urged to fit therein through an open top of member 102.

Linear member 103 is connected pivotally at one end to the inside of and near the end of linear member 102 away from member 101, at a pivot point 105. Further, linear member 103 is pivotally connected to linear member 101 via a mechanical link 104. Mechanical link 104 is pivotally connected to linear member 101 via a pivot mount 106 on the vertical wall surface thereof and strategically disposed some distance from the interfacing end of linear member 101.

Link 104 is pivotally connected to linear member 103 on a vertical wall surface via a pivot point 107. Pivot points 106 and 107 control pivotal movement of linear member 103 about pivot points 105 via link 104 as a direct result of translating linear member 102 relative to linear member 101. Linear member 103 may pivot up from a retracted position substantially parallel to the horizontal plane of the sliding assembly and may attain a maximum zenith in accordance with a strategic position along the linear path of the sliding assembly formed by components 101 and 102.

In some embodiments, pivot point 105 may be approximated by a multi bar linkage with additional control members that cause the linkage to operate as though there is a virtual pivot point at a particular position. Two additional control members, for example, might make a four-bar linkage to accomplish a virtual pivot point. Other multi-bar linkages with slider elements such as a scissor jack may be used to approximate pivot points 105.

In this particular embodiment, linear member 101 includes a relief slot 108 implemented in a vertical wall (facing) and open at the top. Likewise, linear member 102 includes a similar relief slot 109 that may align with slot 108 when linear member 102 is urged completely into member 101. In this implementation, relief slots 108 and 109 align to accept the axle of pivot mount 107 in a retracted position, to enables a low profile and more convenient portability of the frame structure. A length R may generally be taken as the length between the centers of pivot mount axle 106 of link 104 and relief slot 108. R is a radius for the arc of articulation of link 104 and is the same dimension between the centers of the pivot mount axles. Furthermore, this mechanized frame structure may include further links and members and components that may be added to support further articulation based upon the sliding relationship between member 101 and member 102. Stops and lock switches may also be added to frame structure 100 without departing from the spirit and scope of the invention, in order to hold frame structure 100 in any desired position of articulation.

Figure 2:
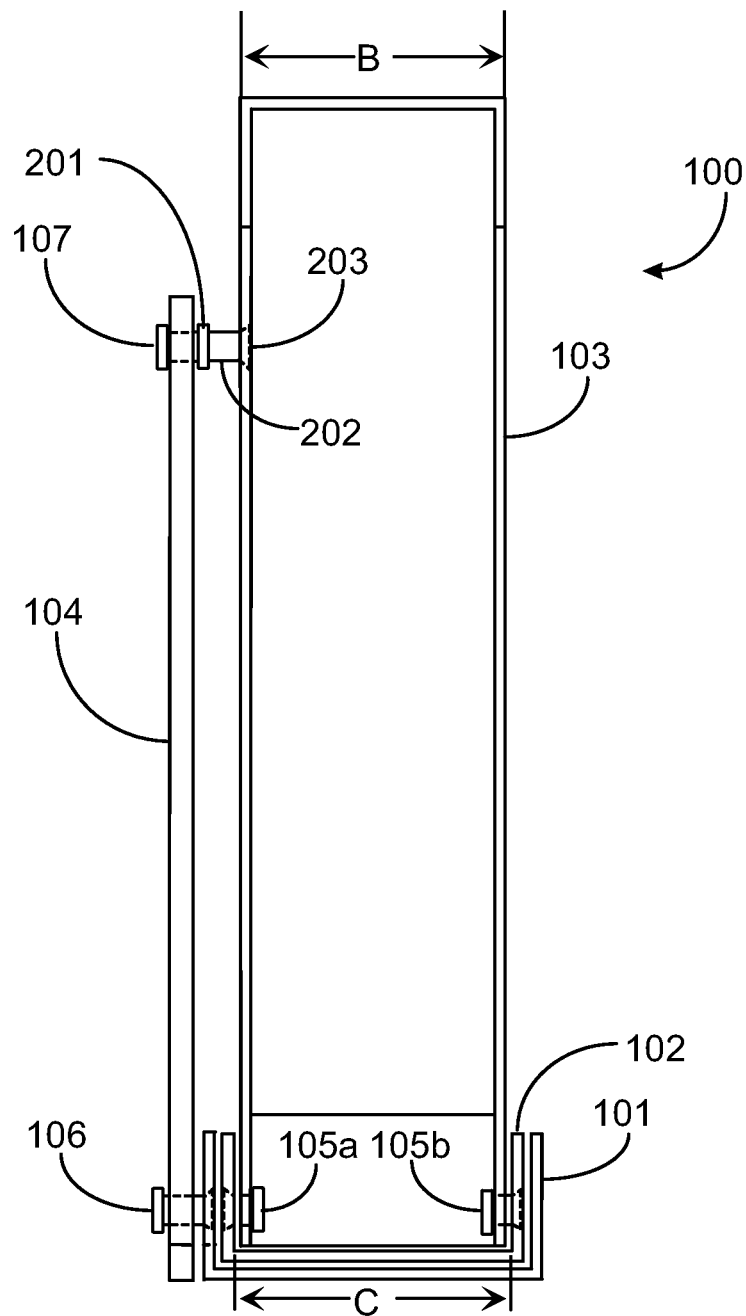
FIG. 2 is an end view of the mechanized frame structure of FIG. 1.

FIG. 2 is an end view of mechanized frame structure 100 of FIG. 1 viewed from the right, with the mechanism deployed as shown in FIG. 1. Linear member 101 is a surface-fixed or fixedly mounted component. Linear component 102 fits snugly into linear member 101, and linear member 103 fits snugly into linear member 102 when frame 100 is in a retracted state for stowing or non-use. Linear member 102 may be urged to translate back and forth within linear member 101. Linear member 103 is pivotally mounted at the end to linear member 102. Linear member 103 has an inverted position relative to linear members 101 and 102 and may rest within the inside width diameter of linear member 102 when frame 100 is in a retracted state as overall width dimension B of linear member 103 is just smaller than inside width dimension C of linear member 102.

Link 104 connects linear member 101 to linear member 103 via pivot mounts 106 and 107 as described above, with reference to FIG. 1.

Figure 3:
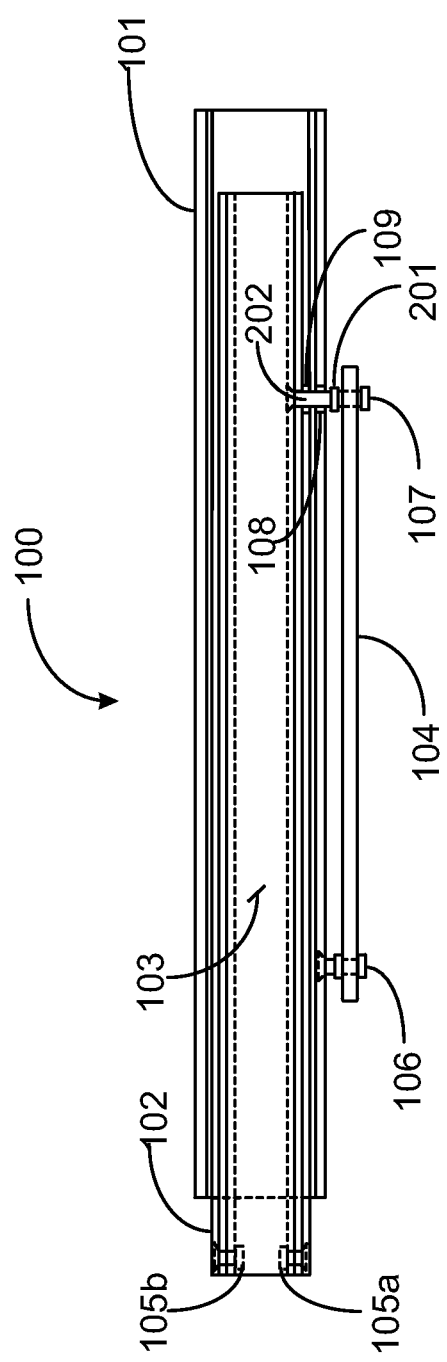
FIG. 3 is an overhead view of the mechanized frame of FIG. 1.

FIG. 3 is an overhead view of mechanized frame 100 of FIG. 1, depicted in a closed or retracted state. In this state linear member 103 nests within linear member 102, which in turn rests within linear member 101. In other implementations, other architectural arrangements might be provided with respect to how linear members 101, 102 and 103 may interact. For example, linear members 101 and 102 may be adjacent to one another or stacked on top of one another but remain parallel to one another where member 102 may be connected to member 101 in parallel and be enabled to move linearly and in parallel relative to the fixed position of member 101 without departing from the spirit and scope of the present invention. IN some embodiments the relative movement may not be exactly parallel.

Figure 4:
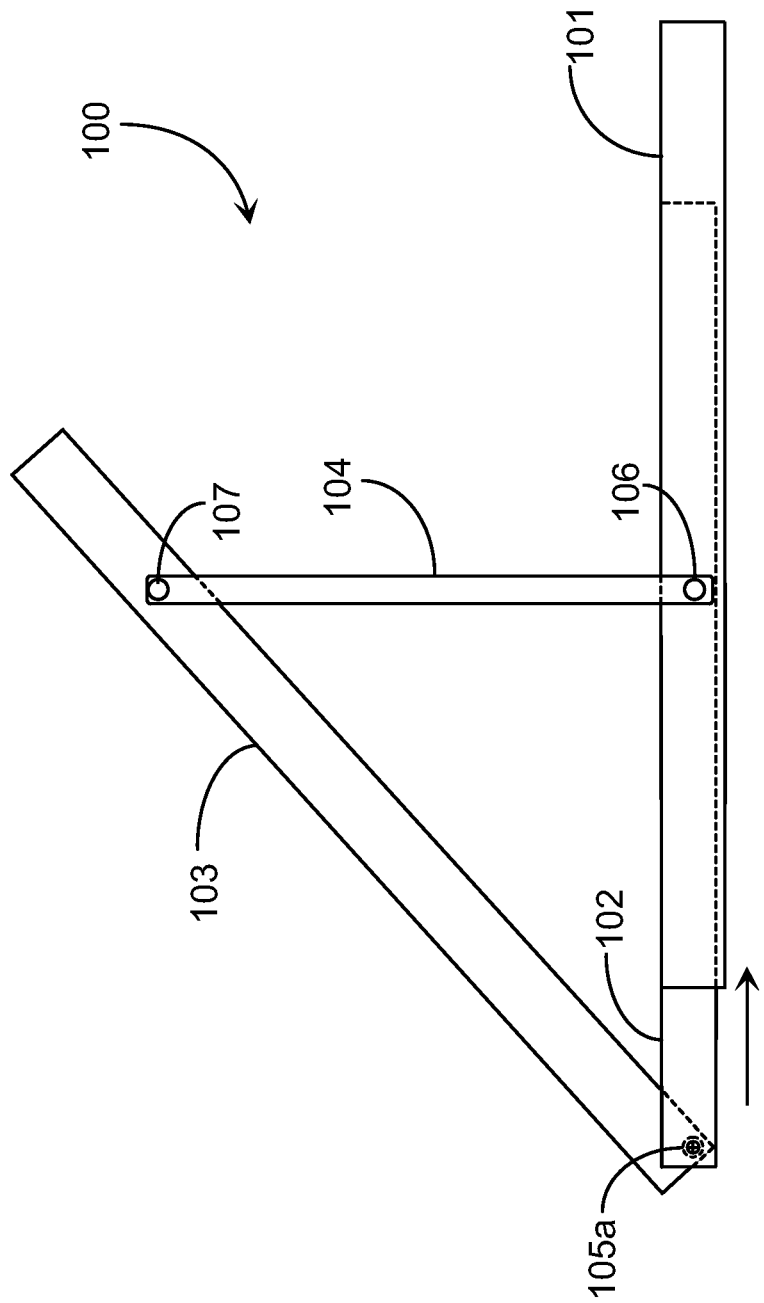
FIG. 4 is a side view of the mechanized frame structure of FIG. 1 fully erected.

FIG. 4 is a side view of mechanized frame structure 100 of FIG. 1 articulated to demonstrate maximum deployed height. This state occurs when link 104 is vertical.

Stops may be installed into the track system to prevent movement past a specific length of extension of linear member 102 out from liner member 101. Lock levers or switches may also be provided to secure a desired length of extension. In this position, linear member 103 assumes or attains a profile of approximately 45 degrees. The overall length of the frame structure may be adjusted. The desired length of extension, which governs the angle and reach of the articulated linear member 103 may be determined by a user or customized by the user.

Figure 5:
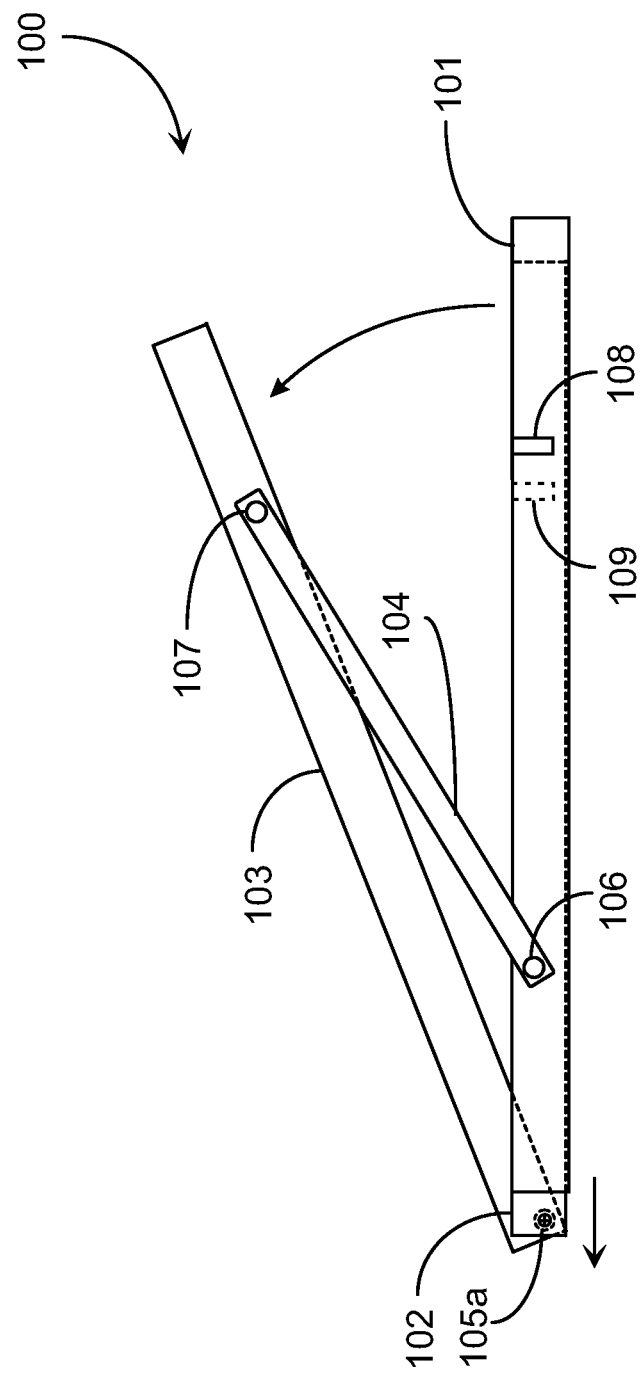
FIG. 5 is a side view of the mechanized frame structure of FIG. 1 mostly retracted.

FIG. 5 is a side view of mechanized frame structure 100 of FIG. 1 mostly retracted. In one implementation, frame 100 may be urged to a retracted state wherein linear member 103 is relaxed back downward to nest within linear member 102. In this example, relief slots 108 on linear member 101 and relief slot 109 on linear member 102 are nearly in alignment to accept pivot mount axle 107. In one implementation, a relaxed frame may be locked into the relaxed or nested state so that unintended articulation of linear member 103 may not occur during transport or while mounted but not in use.

Figure 6:
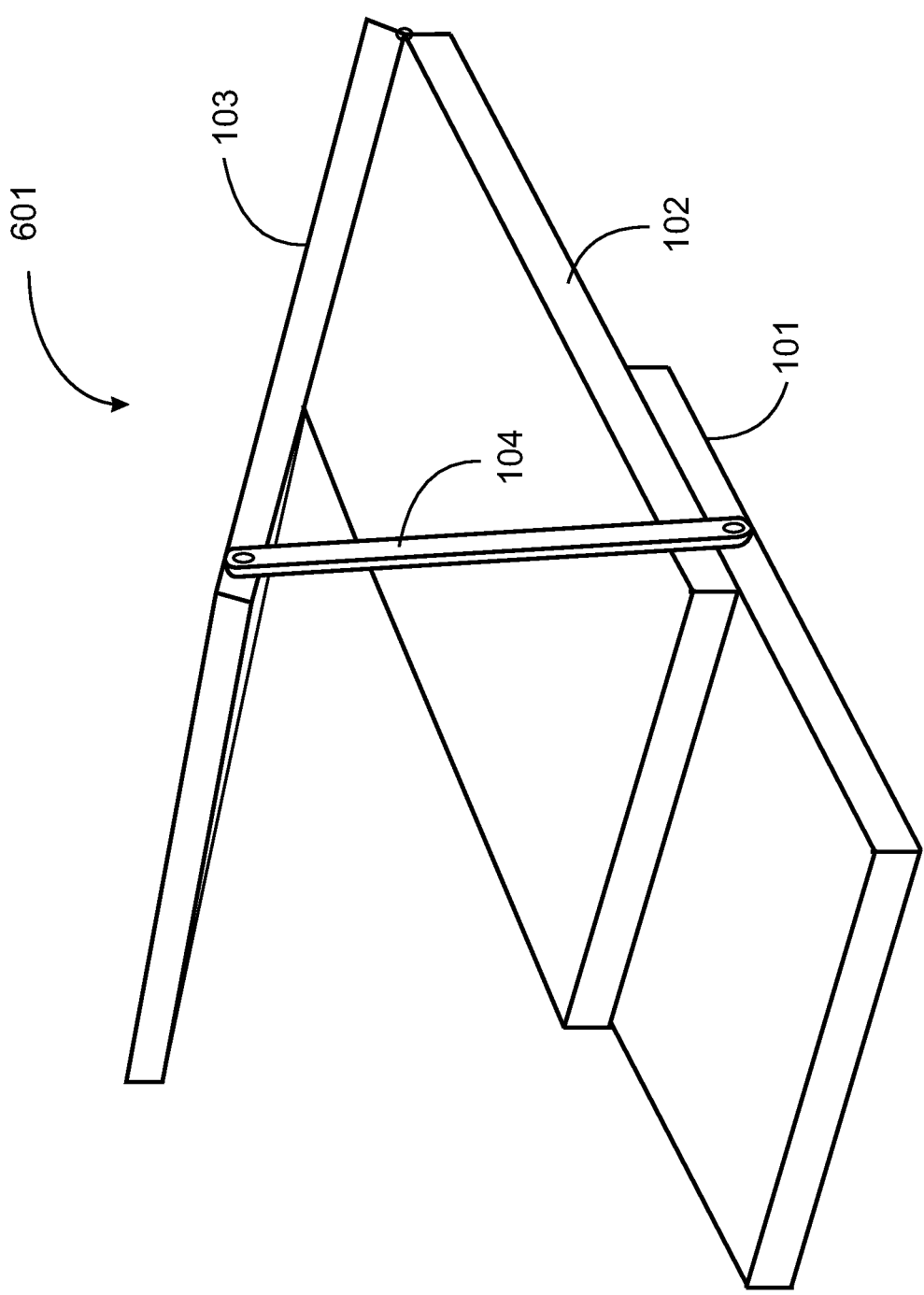
FIG. 6 is a perspective view of a frame structure based on a single linkage mechanism.

FIG. 6 is a perspective view of a mechanized frame structure based on the single linkage of FIG. 5, using the same element numbers as shown in FIG. 5, but having some differences in physical implementation. In the mechanism of FIG. 6, stationary element 101, and extensible element 102 are constrained my translation elements that cause them to translate in parallel, although parallel translation is not a strict limitation in the invention. Element 101 may be, for example, a floor element, and extensible element 102 may be a support for a bed or a mattress. Element 103 is a cover element that will serve as a part of an enclosure in extension, and is pivoted to link 104 near one end, which is also pivoted to element 101 as shown. Element 103 is hinged along one edge to element 102. As element 102 retracts relative to element 101, link 104 pivots counterclockwise, and element 103 closes over elements 101 and 102. As element 102 extends relative to element 101, link 104 causes element 103 to raise, providing at least a portion of an enclosure. In this embodiment, relief slots are not required.

Figure 7:
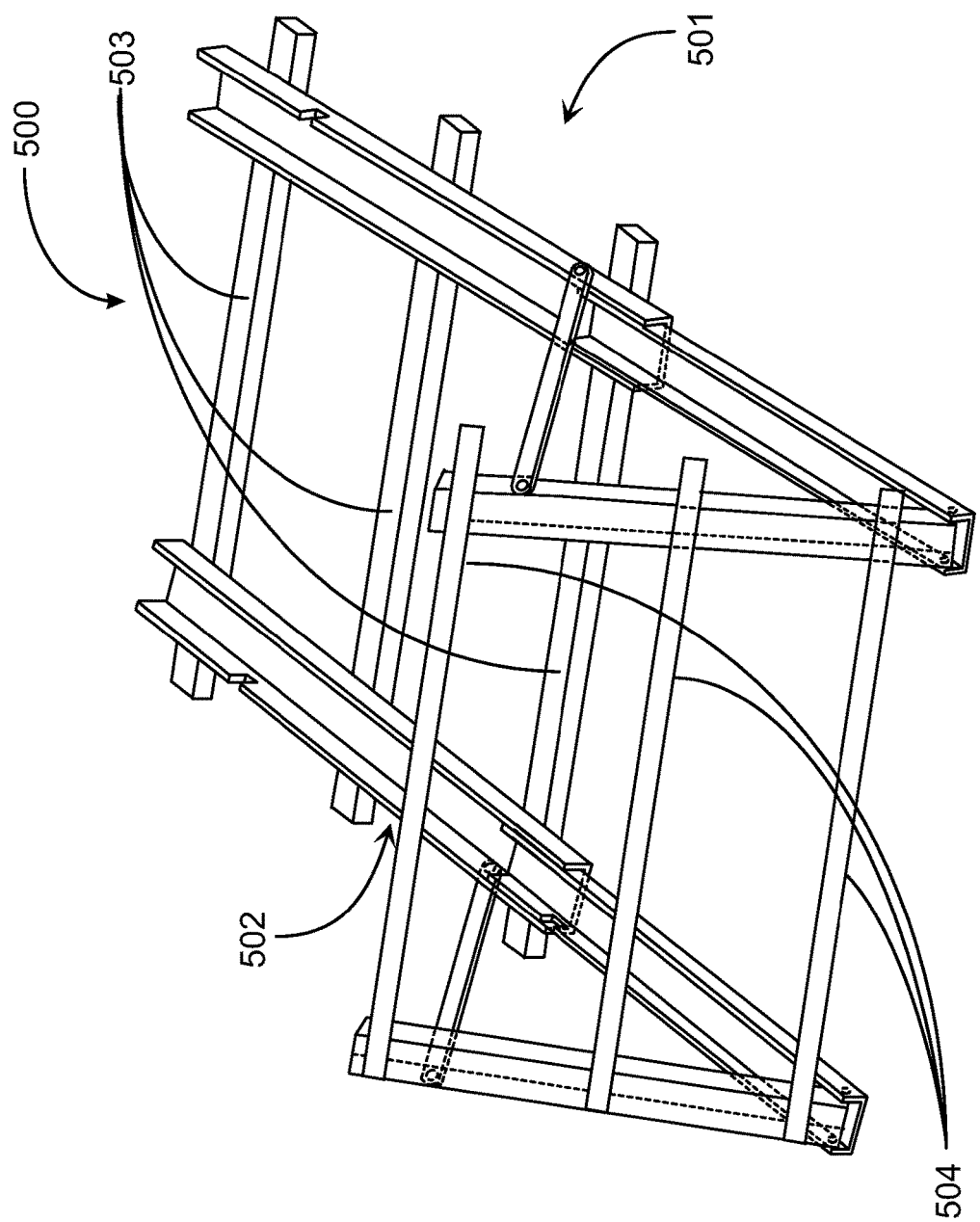
FIG. 7 is a perspective view of a mechanized frame structure reinforced with cross members according an embodiment of the present invention.

FIG. 7 is a perspective view of a mechanized compound frame structure 500, comprising two of the structures 100, joined and reinforced with cross members according an embodiment of the present invention. Frame structure 500 is an articulating structure consisting of two frame assemblies similar to, or identical to assembly 100 of FIG. 1, spaced apart to create a width suitable for a dwelling enclosure, fixed together using frame cross members 503 and 504 to connect the fixed base linear members in the same plane and parallel alignment, and to fix articulating linear members parallel to one another. In this implementation width of an ensuing enclosure is defined by the distance apart that the assemblies 100 are joined to form assembly 500.

Also, in this implementation, mechanization or human manipulation may be provided to just one of the tandem frame assemblies in order to operate the articulating structure or may be applied to both sides. Likewise locks and or stops may also be confined to one side of the structure or may be supplied on both sides of the structure. In an implementation of the present invention, the overall length A as referenced in FIG. 1 may be six feet or a similar length, to enable an enclosure that one may comfortably lie down in, such as on a mattress supported by the horizontal part of the structure. The cross members may also, in one embodiment, be adjustable in length to achieve a desirable width dimension for such as two persons comfortably laying side by side. In one implementation, the width of the structure may be preset and may not be adjustable.

Figure 8:
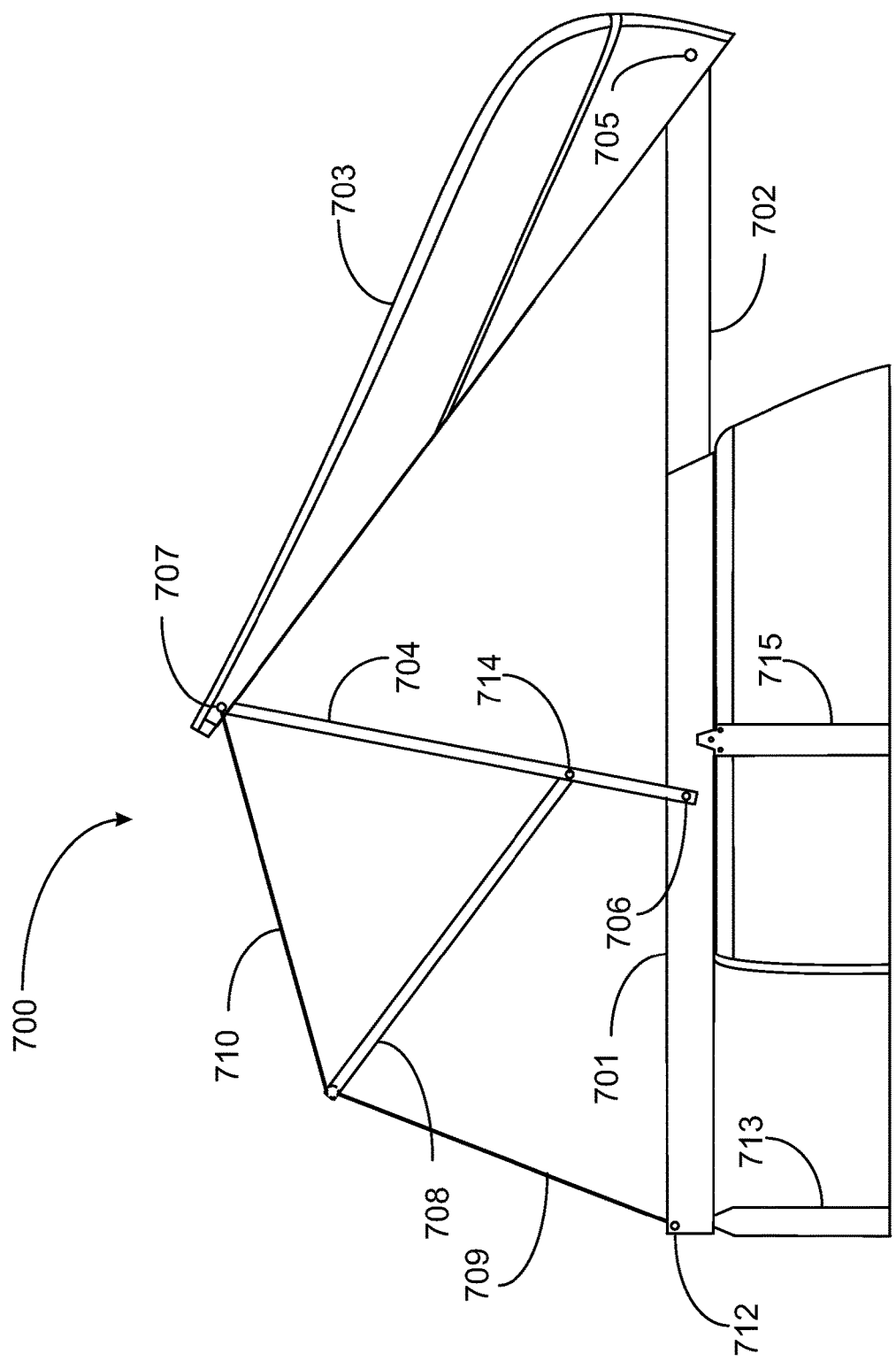
FIG. 8 is a side elevation view of a mechanized frame structure with an extension bar and cables for suspension of a tent according to an embodiment of the present invention.

FIG. 8 is a side elevation view of a mechanized frame structure 700, similar to that of FIG. 5, or of FIG. 6, with an additional extension bar 708, connected with cables 709 and 710, for suspension of a tent according to an embodiment of the present invention. Suspension structure 700 may be a single linkage structure, such as depicted in FIG. 6, or may include two side by side frame assembly components as depicted in FIG. 7. In the case of a side-by-side frame assembly, it should be noted that elements shown and labeled in FIG. 8 may be repeated on the opposite side of the apparatus (into the depth of the page).

Structure 700 may be mounted on a van or truck cab surface, a flatbed, or some other platform surface. In this view structure 700 is articulated and includes a hard cover 703, analogous to elements 103 in frame 100, articulated by a link 704, connected to the cover and to fixed linear member 701, analogous to member 101 of FIG. 1. Linear member 702 is extended out from member 701 to initiate the articulation of the overall frame as previously described.

Hard cover 703 may be manufactured or molded from a durable and weather resistant polymer or it may be a metallic cover. When the mechanized frame structure is in a retracted state, cover 703 folds down over other elements, and may serve to protect any items covered such as tent material, a mattress, or other cargo. Lever locks or latches (not illustrated) may be provided to secure cover 703 down against the retracted frame to prevent unintended articulation. Frame structure 700 further includes in one embodiment extension bar 708, mentioned above, that may in some cases be a u-shaped element mounted to links 704 at pivot points 714, and constrained by cables 709 and 710. In some embodiments, pivot points 714 may be located on linear member 704, or may be concentric with pivot point 706.

In this example, cable 709 may be provided to attach at one end to anchor point 712 at the non-interfacing end of linear member 701. Cable 710 may attach to a point 707 at an end of cover 703. Cables 709 and 710 may be attached at their second ends to anchor points provided on bar 708. Bar 708 may be, as described above, a U-bar that spans the width of the compound frame structure or may be two separate members.

In this example, frame structure 700 may be adapted to suspend a tent, not shown in this view. The cables function to raise bar 708 to a desired angular position from pivot point 714 during articulation of frame 700, resulting from extension of linear member 702 out from linear members 701. In one implementation, a tent may be provided to be suspended at four or more points from the articulated frame apparatus.

In some embodiments, apparatus 700 may be mounted to a truck bed or on top of a vehicle cab such as is depicted here. In this implementation, support posts 713 and 715 are visible on this side. Other supports may be used in other circumstances and embodiments of the invention.

Figure 9:
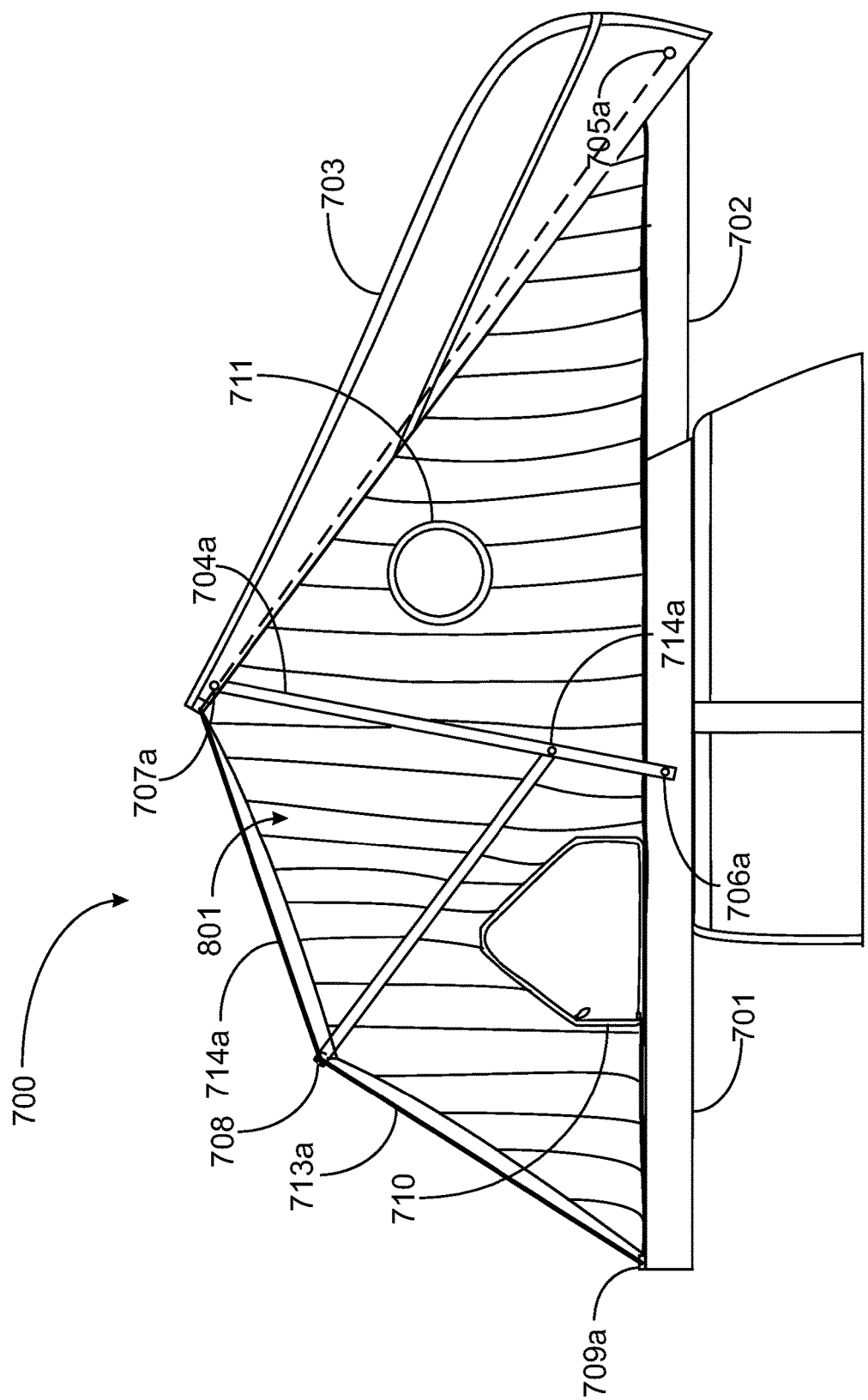
FIG. 9 is a side elevation view of the mechanized frame of FIG. 7 depicting attached tent fabric according to an embodiment of the invention.

FIG. 9 is a side elevation view of mechanized frame 700 of FIG. 7 depicting an attached fabric tent 801 suspended from the articulated portions of the frame structure according to an embodiment of the invention. Frame structure 700 is in a state of extension and suspending tent 801 in this implementation. The tent may include strategically placed features such as hooks or snaps. In this implementation, the tent is confined to the inside of the articulated frame structure relative to the sides and ends of the structure. The lower portion, or floor of the tent may be connected to or attached onto a base or floorboard that may fit just between the frame assemblies on both sides such as resting upon the cross members in between the linear assemblies.

The tent may feature such as a tent door 710 accessible by zipper and a tent window feature 711, but many embodiments may have no doors or windows, and entry and exit may be from below. Such a suspended tent may be fastened by snap, hook, or other methods and hardware to the inside of hard cover 703 on an inside surface at the edges and at the middle portion of the cover with respect to width of the cover. In one implementation, there may be an opening provided in the lower portion or floor of the tent that may be accessed from below the articulated frame structure without departing from the spirit and scope of the present invention. For example, a floorboard may have a trap door where a tent opening is strategically disposed above whereby one may make access into the tent from such as a bed of a pickup where the structure may be on a roof of the truck. In this implementation, the tent material remains within the footprint as the structure is relaxed unto a point where hard cover 703 may cover all the tent material and may be latched down with the tent material remaining inside and protected from the elements. One with skill in the art of pop-up tent structures will appreciate that there may be other ways to suspend a tent beneath structure 700 without departing from the spirit and scope of the invention.

Figure 10:
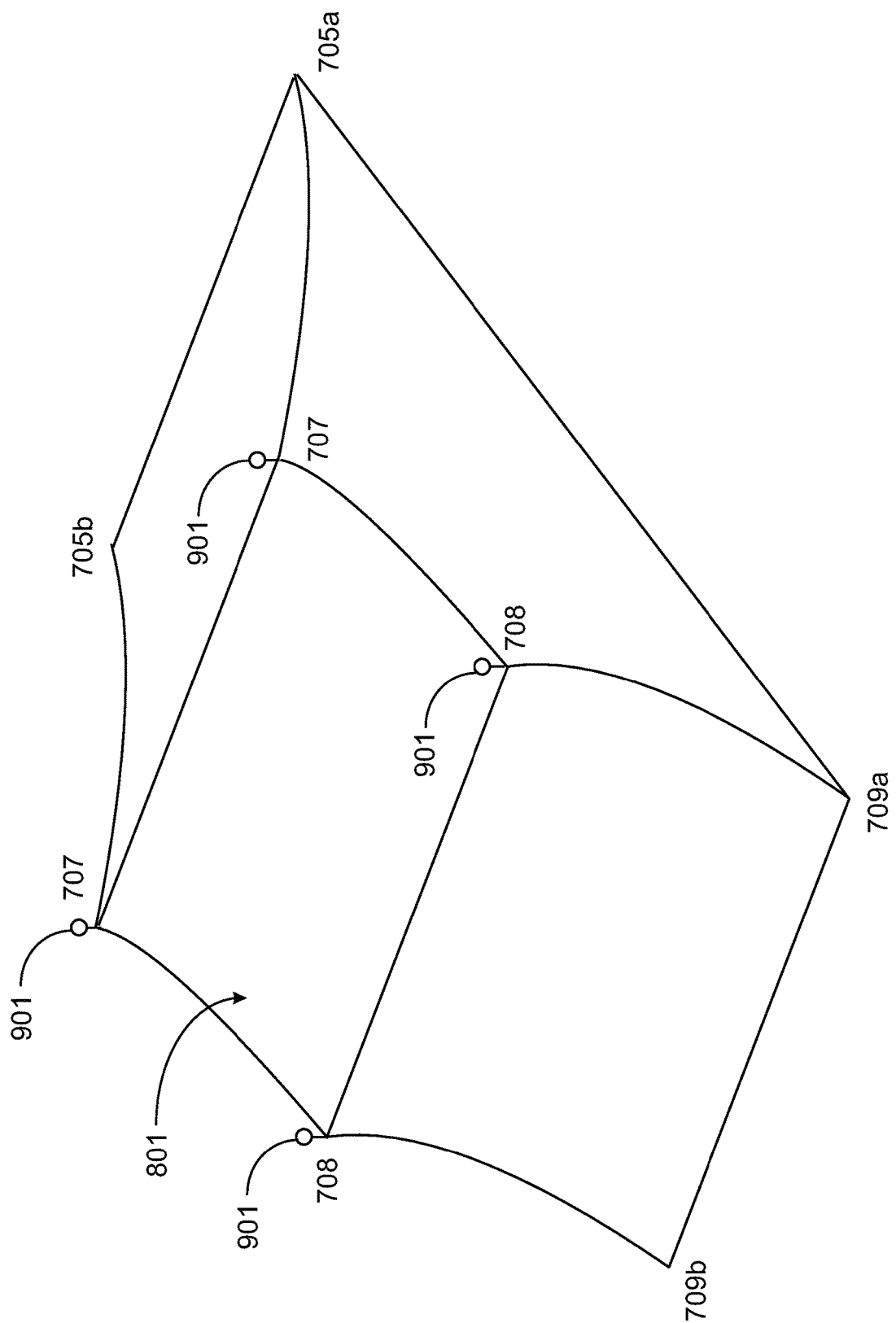
FIG. 10 is a perspective view of a personal enclosure of tent fabric that may be suspended from the mechanized frame structure of FIG. 7.

FIG. 10 is a perspective view of a tent structure 801 that may be suspended from the articulated framing structure 700 according to an embodiment of the present invention. The tent structure may be suspended by hook or fastener such as fasteners 901, which correspond to anchor points on frame structure 700, particularly on bar 708 and at the forward corners of the hard cover 703. In this implementation, there are four corner anchor points at bottom that the tent may be fastened to, more particularly, anchor points 705 on one end and anchor points 712 on the other end. In this implementation, the opening through the tent may be underneath the tent on the side of the tent or on the end of the tent opposite the hard cover.

One with skill in the art of mechanized frames will appreciate that overall frame structure 700 is not limited to a linear or rectangular footprint but that the lateral frame members may in fact not be linear members, but may also be arcuate members that may operate in much the same fashion as the integrated linear members, wherein the resulting articulated frame components create a suspension frame that may be oval, elliptical or annular without departing from the spirit and scope of the present invention.

In another aspect of the invention an add-on, after-market apparatus may be provided that may be assembled to a vehicle, such as a Jeep Wrangler in several models, for example, to provide a foldable dwelling unit integrated with the vehicle, the overall assembly having distinct advantages over what is known in the art at the time of filing the instant CIP application.

Figure 11:
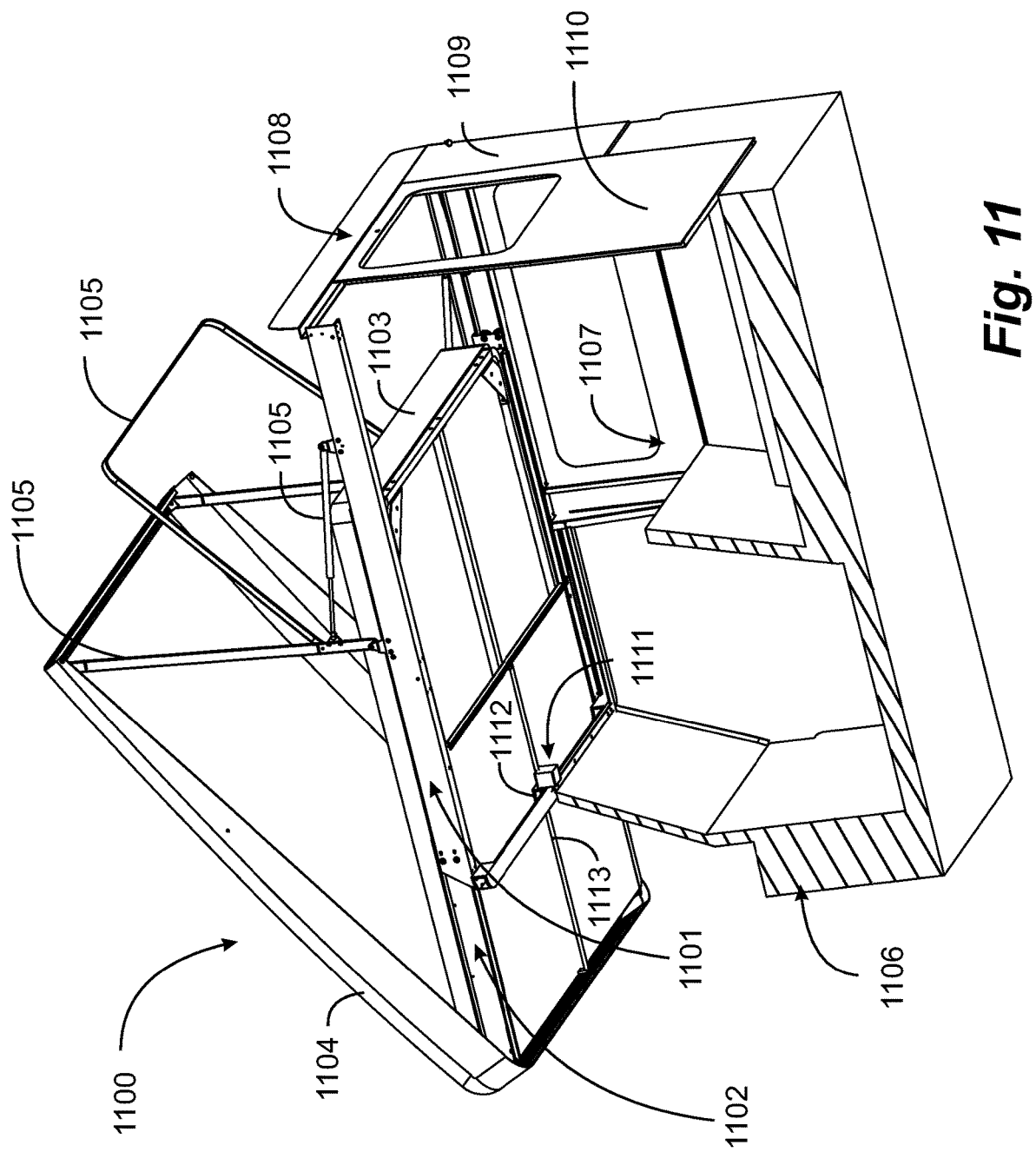
FIG. 11 is a perspective view of a personal enclosure mounted to a vehicle having a removable top, showing details of powered operation in an embodiment of the invention.

FIG. 11 is a perspective view of an add-on apparatus 1100 in an embodiment of the invention. In this example the add-on apparatus is element 1100, and the vehicle to which the apparatus may be added is vehicle 1106, shown in somewhat abbreviated form, and sectioned in half along a lengthwise section line to avoid hiding elements in the figure.

In this example the add-on apparatus comprises a stationary frame 1101 having opposite channels for translation of elements of an extension platform 1102, also having opposite elements tracking in each of the channels of the stationary frame. The tracking is by bearing assemblies which may be of different sorts. In this example there is a rotating male threaded shaft 1113 which engages a nut 1112 fixed to the translatable extension platform 1102, such that turning the threaded shaft 1113 causes the extension platform to extend or retract. A motor 1111 provides motive power for the translation. One with skill in the art of mechanized linear actuators will appreciate that other means or powered linear motion maybe used instead of a leadscrew shown in the Figs. Such powered linear motion actuators may include a cable, chain, belt, rack or cylinders. The power source may be from electricity, hydraulics, pneumatics or mechanical power takeoff from the engine.

As the extension platform extends from a fully retracted state top cover 1104, hinged at a front position to the extension platform, is raised, with one end pivoting on links 1105 pivoted to the stationary frame. Other links 1105 help guide the deployment of the links, which support a fabric cover (not shown) but illustrated previously in this specification.

The extension platform 1102 carries in this example a mattress 1103, which provides sleeping quarters below the deployed top 1104 and canvas covers.

In this example stationary frame 1101 is attached to the top of a windshield of the receiving vehicle, and has downwardly extending side panels 1107 that are bolted or otherwise fastened to rails of the stationary frame, and are enabled to be side rear panels 1109 and a door 1110 which, when the add-on is fully assembled, provide access to the living quarters provided by the vehicle with the add-on apparatus assembled.

Figure 12:
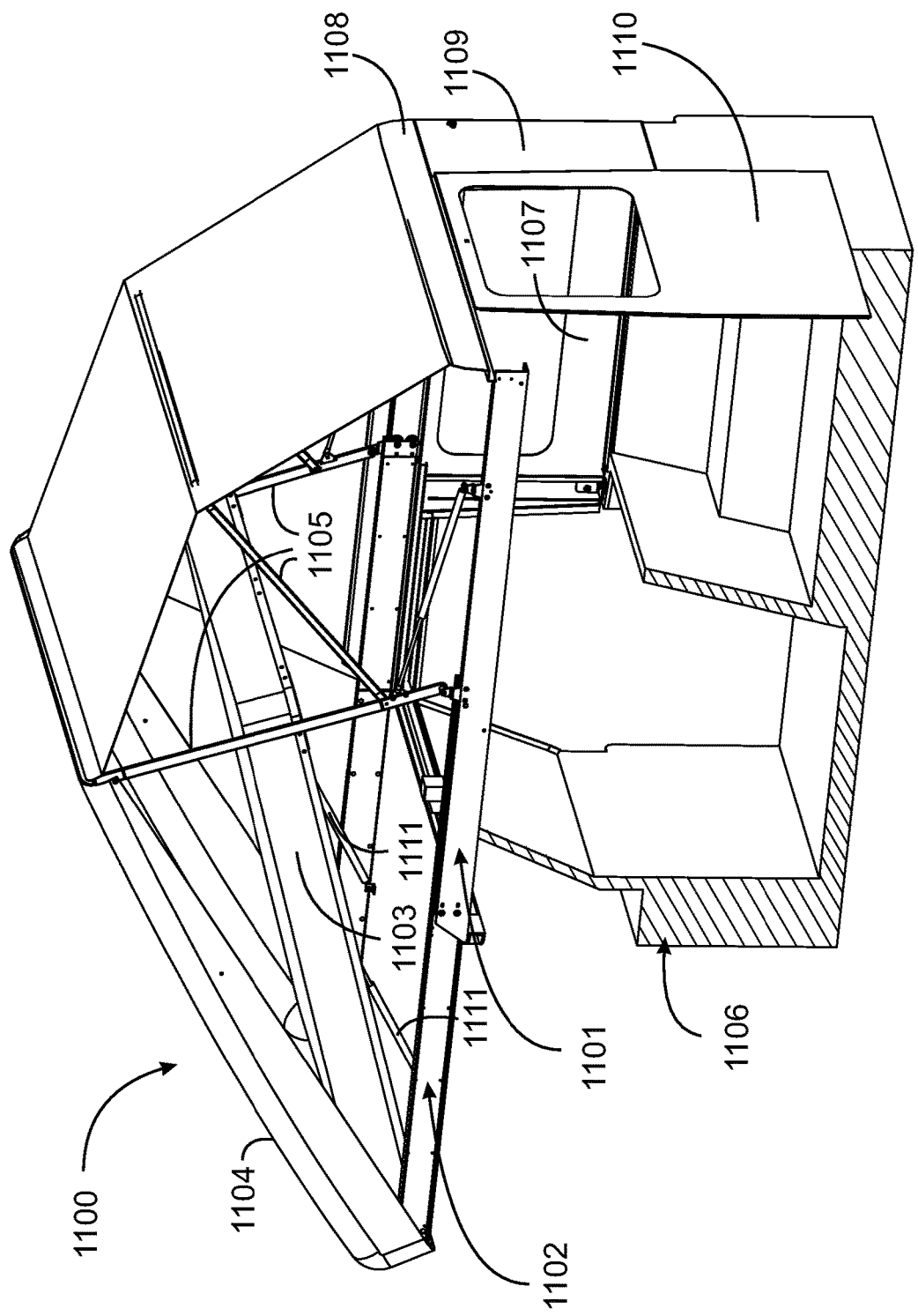
FIG. 12 is a perspective view of the personal enclosure of FIG. 11 showing movement of a mattress.

FIG. 12 is a perspective view of the add-on apparatus 1100 of FIG. 11 assembled to vehicle 1106, as in FIG. 11. FIG. 12 is from a somewhat different viewpoint than is FIG. 11, and the deployment of the extension platform is further than shown in FIG. 11. In the position of deployment of extension platform 1102 in FIG. 12, mattress 1103, which is pivoted at a horizontal axis at the front of the extension platform, is shown partially raised. When extension platform is fully extended, and the mattress is fully pivoted upward, there is considerable additional headroom in the living area than if the mattress were not raised. It should be understood that the position of the mattress relative to raised or not, may be changed with the add-on apparatus fully extended, to be either up or down. There may be latch elements whereby the mattress position may be locked either up or down.

Figure 13:
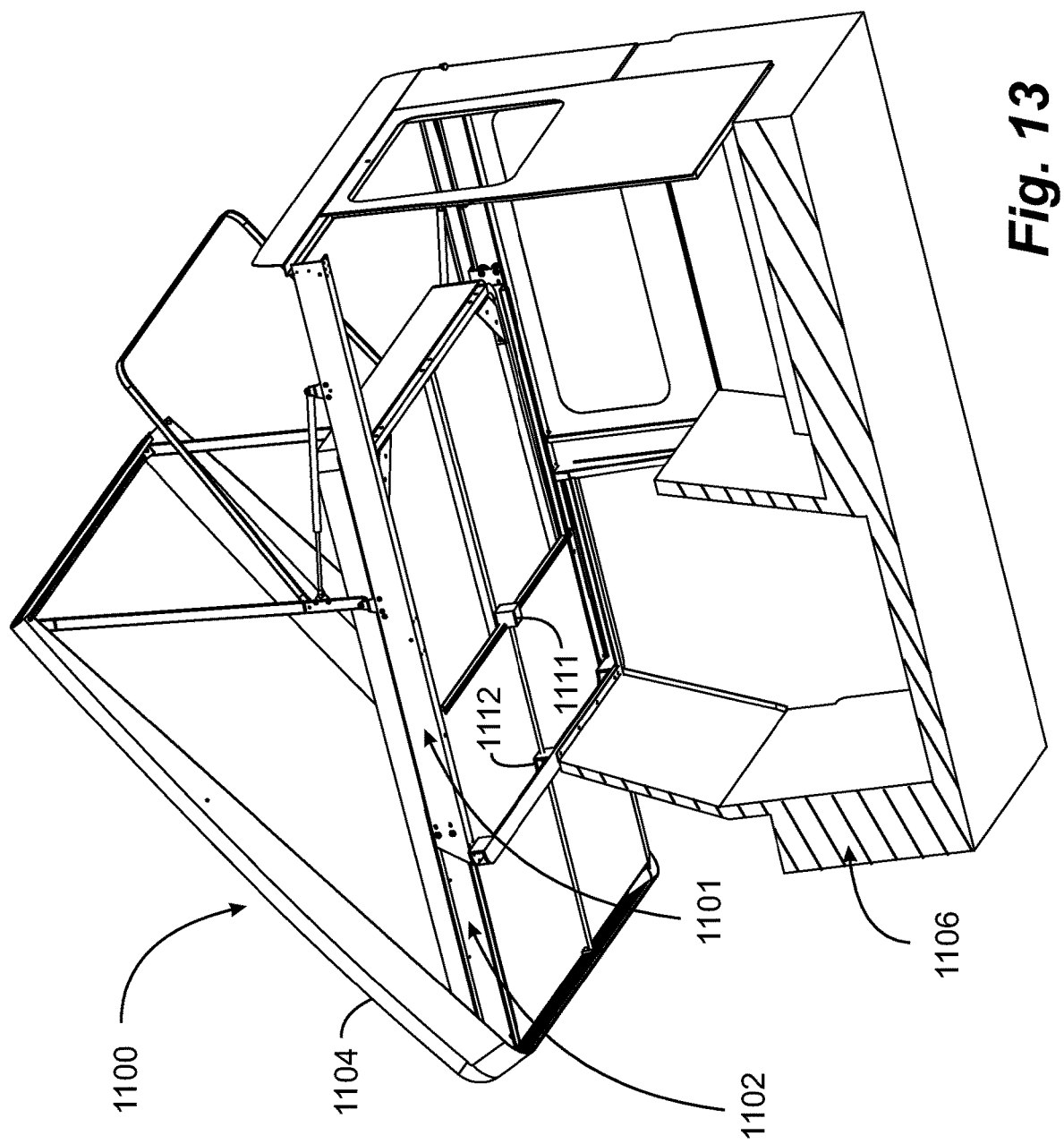
FIG. 13 is a perspective view of a personal enclosure having an alternative powering mechanism in an embodiment of the invention.

FIG. 13 is a perspective view of a personal enclosure having an alternative powering mechanism in an embodiment of the invention. Many, but not all of the elements of FIGS. 11 and 12 are shown in FIG. 13. An essential difference in the example of FIG. 13 is that the drive elements, being motor 1111, travel nut 1112 and shaft 1113 are repositioned where the motor moves with the extension platform 1102.

Figure 14:
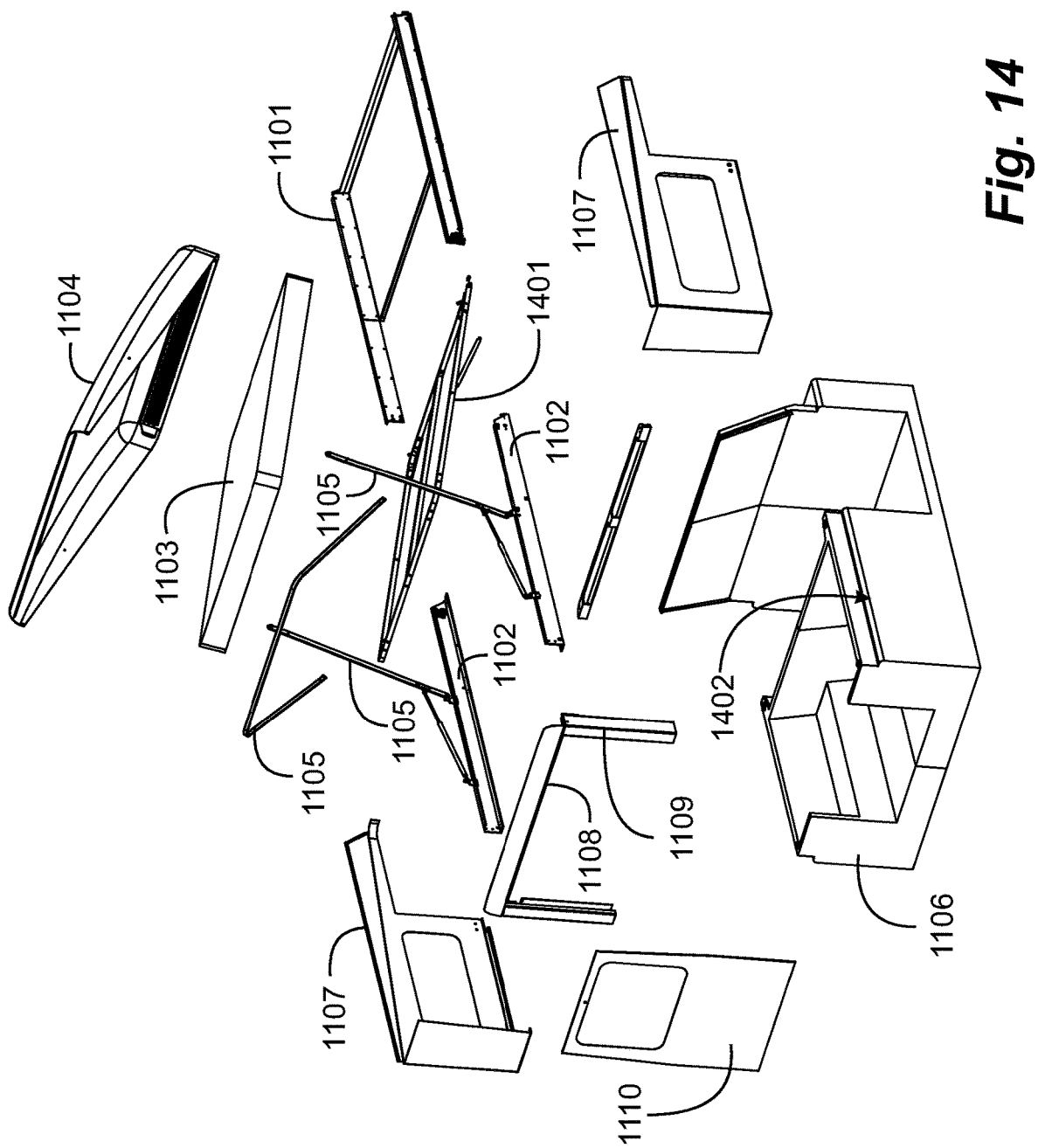
FIG. 14 is an exploded view of the personal enclosure and adjacent elements in an embodiment of the invention.

FIG. 14 is an exploded view of the personal enclosure 1100 as an add-on to a vehicle 1106, showing also the vehicle and adjacent elements in an embodiment of the invention. Not every element is annotated, but most are, with element numbers the same as in preceding Figs. The view is from a completely different viewpoint than the other Figs., and vehicle 1106 is not sectioned. One element 1401 in FIG. 14 is not described with regard to earlier views and is a linkage mechanism in support of pivoting mattress 1103.

Side elements 1107, as described above, are a part of the add-on rather than of the vehicle, and shelf area 1402 on the vehicle is a receiving interface for lower extremities of side elements 1107 to attach the add-on assembly to the vehicle.

Figure 15:
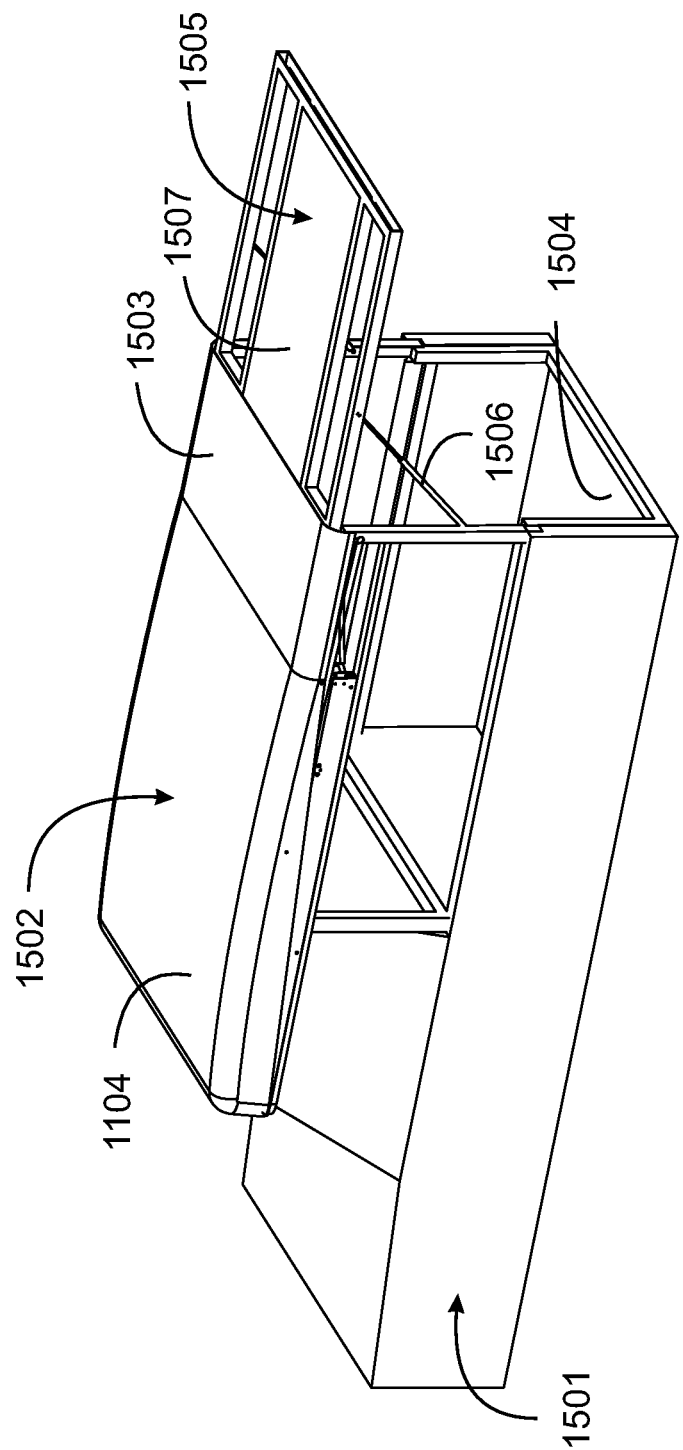
FIG. 15 is a perspective view of a personal enclosure adapted to a pickup truck in an embodiment of the invention.

FIG. 15 is a perspective view of a personal add-on enclosure 1502 adapted to a pickup truck 1501 in an embodiment of the invention. In this example the forward position of the stationary frame, and the extension platform retracted is at the upper point of the windshield of the truck. An extension 1503 of top cover 1104 is added to cover the overall length of the truck from the front of the cab, as shown, and the rear of truck bed 1504. Some of the working elements of the foldable enclosure may be seen under cover 1104 and are essentially the same as shown and described above. A hinged panel 1505 includes a door 1507 and is managed in opening and closing by links 1506.

Figure 16:
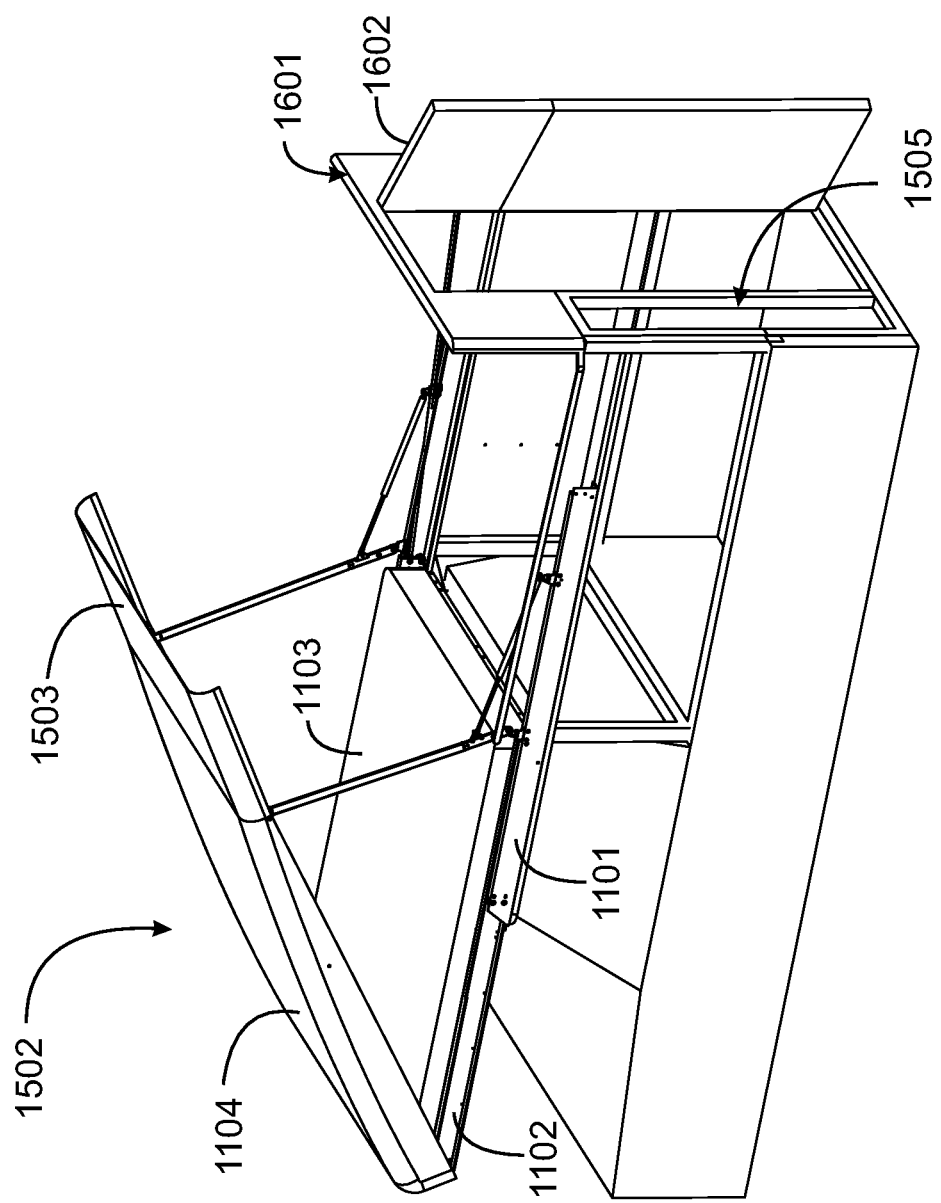
FIG. 16 is a perspective view of the personal enclosure adapted to a pickup truck, fully deployed.

FIG. 16 is a perspective view of the personal enclosure adapted to a pickup truck, partly deployed. It may be seen that the forward extent of the extension platform 1102 is, in this example considerably forward of the cab of the pickup truck. Panel 1505 is shown rotated down to vertical and joined to the side struts and bed of the truck, which has, in this example, the tailgate removed.

On element not before illustrated or described in FIG. 16 is a panel 1601, which in FIG. 15 is under portion 1503 of the cover. In the state shown in FIG. 16 this panel is rotated upward to vertical and includes an upper portion for the door 1602. Although not shown in the figure, the fabric portions of the enclosure, which attach along a rear edge of extension 1503, also attach along a top edge of panel 1601. There may or may not be additional struts 1505 (seen in other figures) to provide even further headroom in the fully deployed state.

In some embodiments mattress 1103 may be pivoted at the front and rotated upward to latch to the raised cover, to provide ample room in the enclosure. A user may provide such as small tables and chair as desired. A user may also reposition the driver or front passenger seat as desired.

Figure 17:
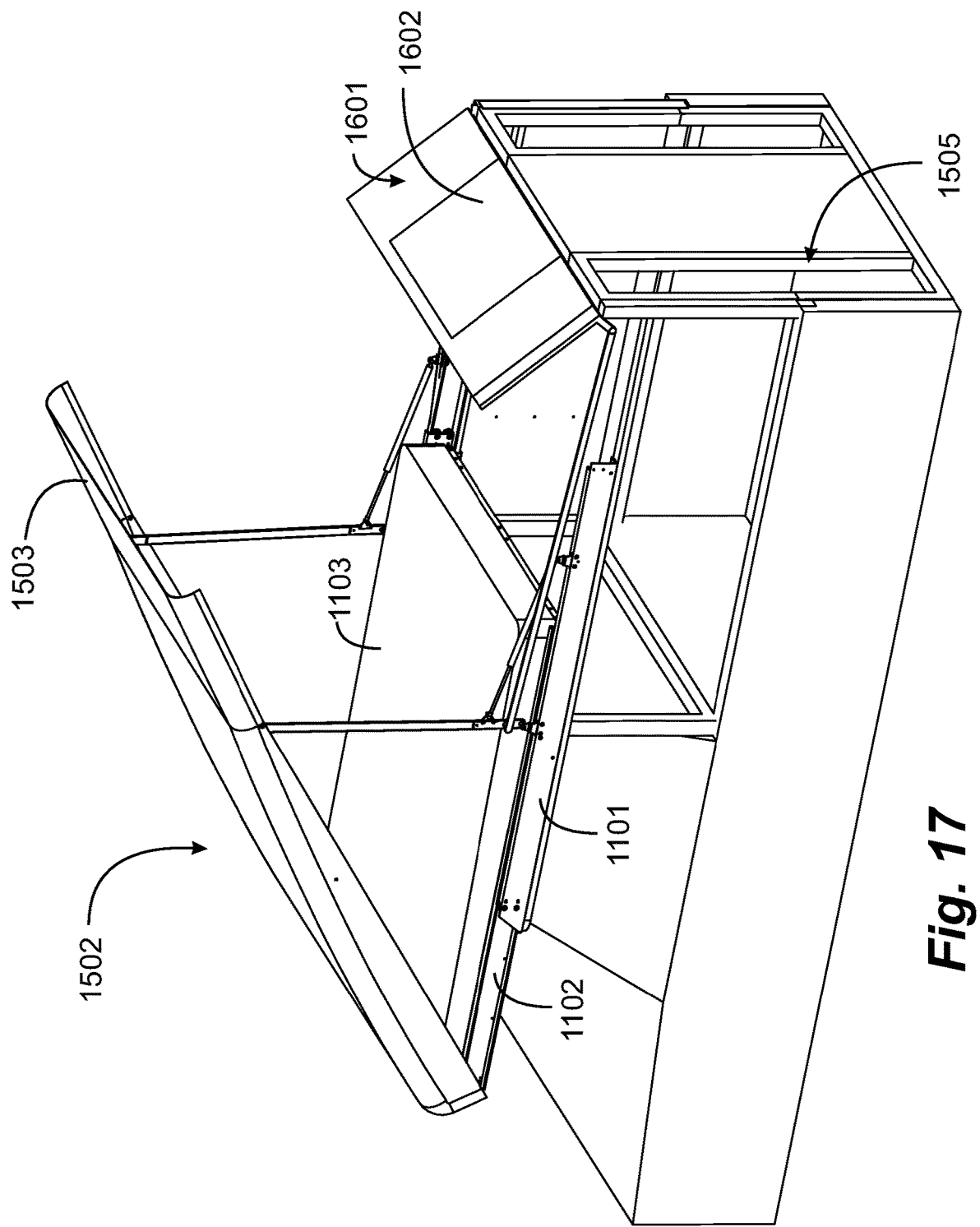
FIG. 17 is a perspective view of the enclosure of FIG. 16 in another state of deployment.

FIG. 17 is a perspective view of the enclosure of FIG. 16 in another state of deployment, wherein the apparatus has been fully deployed, and is in process of being folded up. This state may also be seen as an intermediate state in deployment. It may be seen that the forward extent of extension platform 1102 is about halfway between fully extended and fully retracted. Hinged panel 1601 and 1602, therefore, is about halfway rotated between horizontal and vertical.

Figure 18:
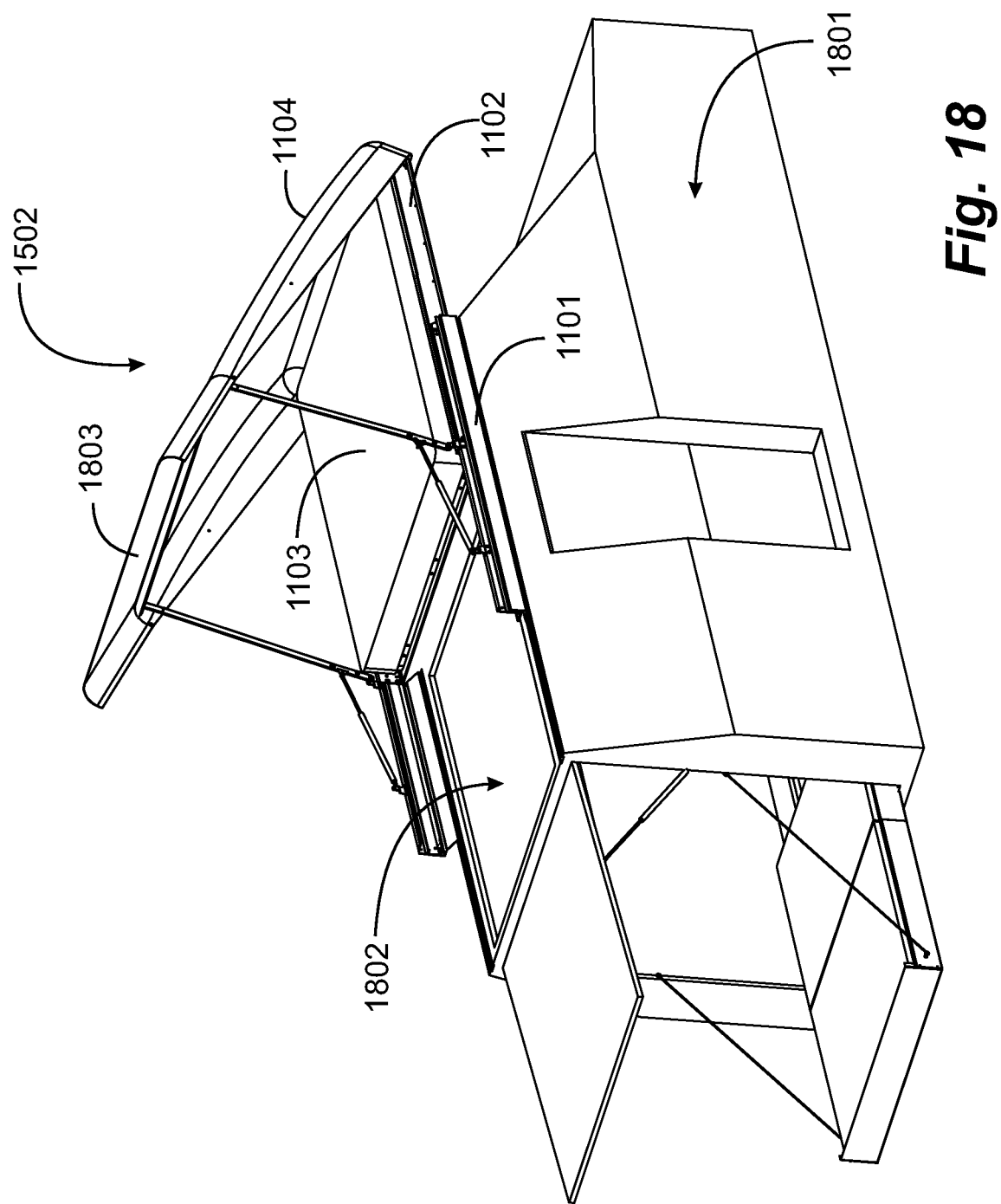
FIG. 18 is a perspective view of an add-on apparatus in an embodiment of the invention for a van.

FIG. 18 is a perspective view of an add-on apparatus 1502 in an embodiment of the invention for a van 1801. In this implementation an opening 1802 is provided in the roof of the van, and apparatus 1502 is assembled to the top of the van around the opening. In this example there is an extension 1803 of cover 1104 to cover all of opening 1802. A van may have one or more side access doors, where the rear entry may be repurposed for other uses such as retractable sleeping quarters and/or cargo access.

Figure 19:
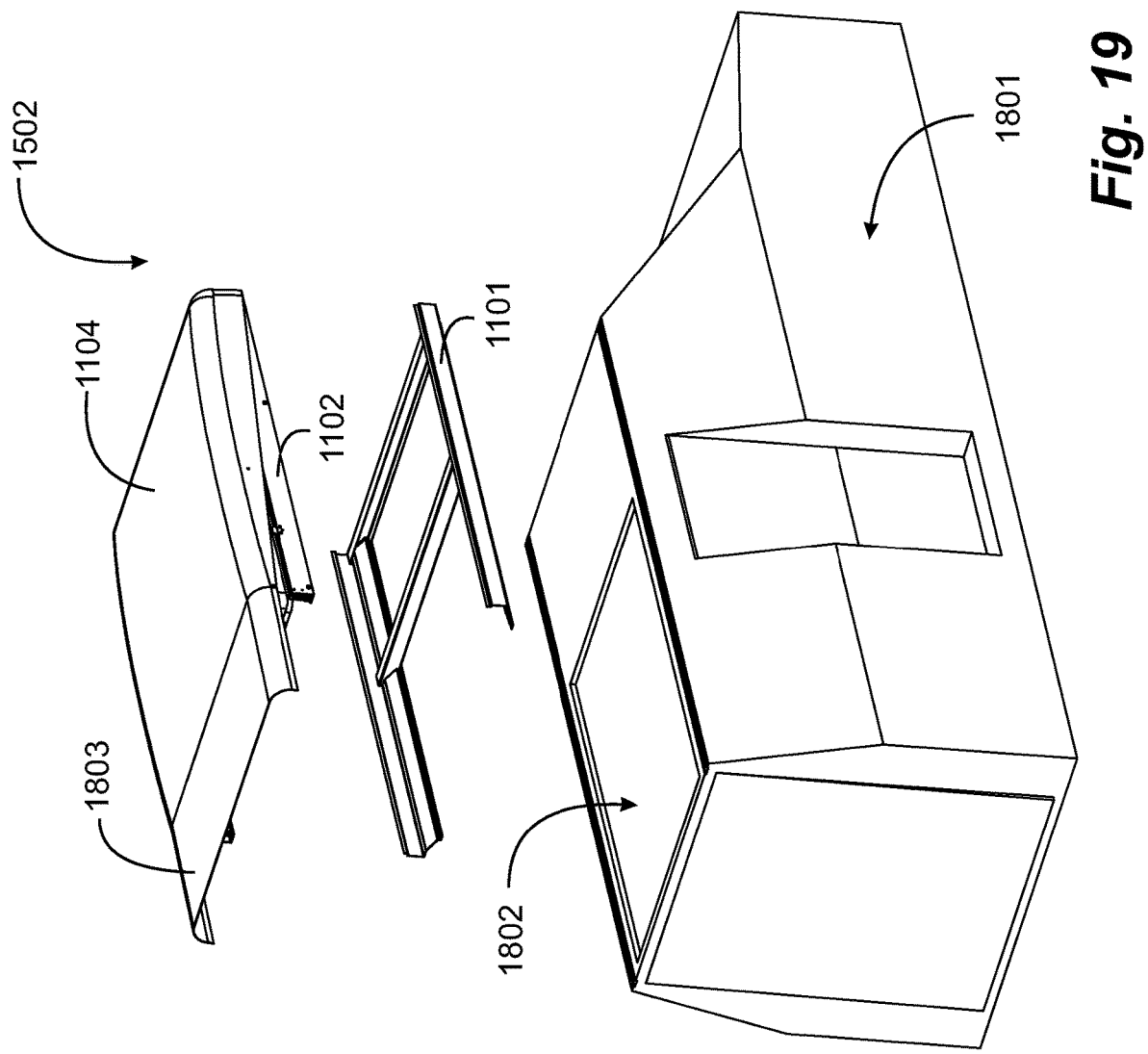
FIG. 19 is an exploded view of the application of an add-on apparatus to a van, as in FIG. 18.
Figure 20:
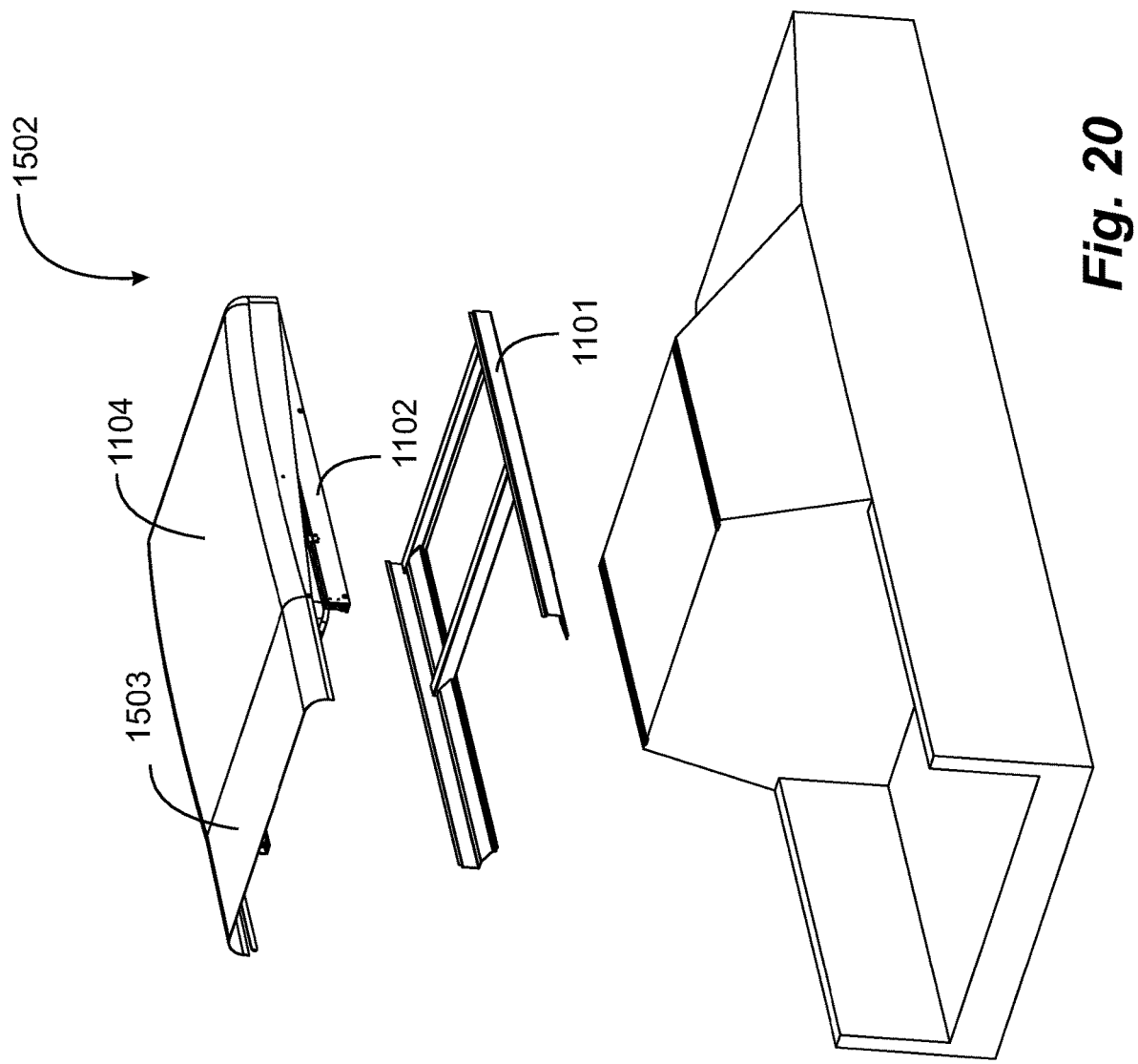
FIG. 20 is an exploded view of application of an add-on device to a pickup truck, as in FIG. 15.

FIG. 19 is an exploded view of the application of an add-on apparatus to a van's roof attachment points such as would be used with a roof rack, as in FIG. 18, FIG. 20 is an exploded view of an add-on device for a pickup truck, as in FIG. 15, but with an extended cab and using the roof attachment points as in FIG. 19. The exploded views are believed to provide further description of the nature of assembly of the elements.

It will be apparent to one with skill in the art that the retractable framing system of the invention capable of suspending and or supporting a fabric enclosure may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will further be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented within the scope of the invention. The invention is limited only by the breadth of the claims below.

The invention claimed is:

1. An add-on articulated dwelling apparatus for a vehicle having a removable top and a cab with a windshield, comprising:
   a stationary frame having opposite parallel channels for translating an extension platform, a forward edge and a trailing edge;
   an extension platform having parallel linear members slidably engaged in the channels of the stationary frame, the extension platform having an extended edge and a trailing edge;
   a mattress carried by the extension platform;
   a cover panel hinged to the extended edge of the extension frame, and joined by pivoting links to the opposite parallel channels of the stationary frame;
   fabric panels joined to an edge of the cover panel opposite the hinged edge, and to the trailing edge of the stationary frame, and to links pivotally joined to the stationary platform; and
   two side panels joined beneath the opposite parallel channels of the stationary frame, the side panels adapted to join along bottom edges to mounting shelves provided on the vehicle;
   wherein the add-on articulated dwelling is assembled to the vehicle by removing the top of the vehicle, joining the side panels to the mounting shelves, placing the parallel channels of the stationary frame along opposite sides of the vehicle, and joining the forward edge of the stationary frame to the vehicle across the top of the windshield.

2. The add-on dwelling apparatus of claim 1 wherein the mattress is carried by a frame that is hinged to the front of the extension platform, and comprising link elements adapted to pivot the mattress frame around the hinge to lift the mattress to be coplanar with the cover with the extension frame fully extended.

3. The add-on dwelling apparatus of claim 2 wherein the mattress frame comprises latch elements adapted to latch the mattress frame parallel with the extension frame, or to latch the mattress frame to the raised cover.

4. The add-on dwelling apparatus of claim 1 further comprising a powered translation system controllable to extend and retract the extension frame.

5. The add-on dwelling apparatus of claim 4 wherein the translation system comprises a threaded shaft rotatably mounted to the extension frame and driven by a motor, and a translation nut engaging the threaded shaft, such that running the motor in one direction extends the extension frame, and in an opposite direction retracts the extension frame.

\* \* \* \* \*